(12) United States Patent
Wang et al.

(10) Patent No.: US 10,737,402 B2
(45) Date of Patent: Aug. 11, 2020

(54) ELECTRIC HAIR CUTTER

(71) Applicant: Panasonic Intellectual Property Management Co., Ltd., Osaka (JP)

(72) Inventors: Wei Wang, Shiga (JP); Takashi Yamaguchi, Shiga (JP); Qinghui Yan, Guangzhou (CN)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 59 days.

(21) Appl. No.: 15/876,686

(22) Filed: Jan. 22, 2018

(65) Prior Publication Data

US 2018/0207817 A1 Jul. 26, 2018

(30) Foreign Application Priority Data

Jan. 26, 2017 (CN) .......................... 2017 1 0061467

(51) Int. Cl.
*B26B 19/28* (2006.01)
*B26B 19/38* (2006.01)
(Continued)

(52) U.S. Cl.
CPC .............. *B26B 19/28* (2013.01); *B26B 19/06* (2013.01); *B26B 19/105* (2013.01);
(Continued)

(58) Field of Classification Search
CPC ..... B26B 19/28; B26B 19/282; B26B 19/284; B26B 19/06; B26B 19/3853
(Continued)

(56) References Cited

U.S. PATENT DOCUMENTS 3,372,481 A * 3/1968 Skinner ................... B26B 19/06
30/210
3,842,498 A * 10/1974 Mizobata ................ B26B 19/02
30/216
(Continued)

FOREIGN PATENT DOCUMENTS

EP 151971 A2 * 8/1985 ............. B26B 19/28
EP 2123408 A1 * 11/2009 ............. B26B 19/06
(Continued)

OTHER PUBLICATIONS

Extended European Search Report issued in Application No. 18152913.2 dated Jun. 22, 2018.

Primary Examiner — Jason Daniel Prone
(74) Attorney, Agent, or Firm — McDermott Will & Emery LLP

(57) ABSTRACT

An electric hair cutter includes a motion conversion mechanism that converts rotary motion of an output shaft of an electric motor into reciprocating linear motion and a movable blade driven by reciprocating linear motion of the motion conversion mechanism. The motion conversion mechanism includes a first conversion portion, converting rotary motion of the output shaft into reciprocating rotary motion about a first axis, a second conversion portion, converting the reciprocating rotary motion into reciprocating linear motion, and an output portion, coupling the second conversion portion to the movable blade. The second conversion portion includes a motion transmission part, coupling the first conversion portion to the output portion, and an elastic deformation part coupled to the motion transmission part to restrict motion of the motion transmission part caused by motion components differing from a motion component in an output direction so that the motion transmission part linearly reciprocates.

10 Claims, 10 Drawing Sheets

(51) Int. Cl.
  *F16H 25/20* (2006.01)
  *B26B 19/10* (2006.01)
  *B26B 19/06* (2006.01)

(52) U.S. Cl.
  CPC ...... *B26B 19/3846* (2013.01); *B26B 19/3853* (2013.01); *F16H 25/20* (2013.01)

(58) Field of Classification Search
  USPC .............. 30/208–210, 215, 216, 43.7–43.92
  See application file for complete search history.

(56) References Cited

U.S. PATENT DOCUMENTS

| | | | | |
|---|---|---|---|---|
| 4,019,252 A * | 4/1977 | Port | ........................ | B26B 19/28 30/43.92 |
| 4,221,050 A * | 9/1980 | Walter | .................... | B26B 19/20 30/216 |
| 4,498,237 A * | 2/1985 | MacK | .................... | B26B 19/20 30/216 |
| 4,542,585 A * | 9/1985 | Ito | ............................ | B26B 19/06 30/210 |
| 4,570,499 A * | 2/1986 | Durr | ........................ | B26B 19/28 30/43.92 |
| 4,651,761 A * | 3/1987 | Suen | ........................ | B26B 19/20 30/210 |
| 4,723,362 A * | 2/1988 | Boerger | .................. | B26B 19/06 30/218 |
| 4,813,133 A * | 3/1989 | Locke | ...................... | B26B 19/06 30/215 |
| 5,088,200 A * | 2/1992 | Piwaron | .................. | B26B 19/06 30/216 |
| 5,165,172 A * | 11/1992 | Weinrauch | ............ | B26B 19/063 30/210 |
| 5,259,116 A * | 11/1993 | Laube | ...................... | B26B 19/24 30/209 |
| 5,544,415 A * | 8/1996 | Huang | .................... | B26B 19/06 30/210 |
| 5,679,991 A * | 10/1997 | Wolf | ........................ | B26B 19/04 310/37 |
| 6,357,118 B1* | 3/2002 | Eichhorn | .............. | B26B 19/048 30/43.92 |
| 6,421,922 B2* | 7/2002 | Beutel | .................... | B26B 19/063 30/210 |
| 6,901,664 B2* | 6/2005 | Melton | ................... | B26B 19/06 30/210 |
| 7,251,896 B2* | 8/2007 | Khubani | ................. | B26B 19/02 30/210 |
| 7,346,990 B2* | 3/2008 | Dirks | ..................... | B26B 19/06 30/210 |
| 7,624,506 B2* | 12/2009 | Melton | ................... | B26B 19/28 30/210 |
| 7,748,123 B2* | 7/2010 | Bednar | ................... | B26B 19/02 30/210 |
| 7,757,404 B2* | 7/2010 | Ouchi | ................... | B26B 19/063 30/216 |
| 8,079,149 B2* | 12/2011 | Bednar | ................... | B26B 19/02 30/210 |
| 8,418,369 B1* | 4/2013 | Laube | ................. | B26B 19/3893 30/210 |
| 9,144,911 B2* | 9/2015 | Arndt | ...................... | B26B 19/28 |
| 9,248,577 B2* | 2/2016 | Gilbert | .................... | F16H 21/16 |
| 9,346,179 B2* | 5/2016 | Ziegler | .................... | B26B 19/06 |
| 10,279,492 B2* | 5/2019 | Phoon | .................... | B26B 19/28 |
| 2005/0055834 A1* | 3/2005 | Cheah | .................... | B26B 19/06 30/210 |
| 2005/0097757 A1* | 5/2005 | McCambridge | ...... | B26B 19/063 30/210 |
| 2006/0059696 A1* | 3/2006 | Derby | .................... | B26B 19/06 30/210 |
| 2008/0052914 A1 | 3/2008 | Bednar | | |
| 2009/0144988 A1* | 6/2009 | Lau | ........................ | B26B 19/205 30/208 |
| 2010/0031514 A1* | 2/2010 | Kohn | ...................... | B26B 19/06 30/216 |
| 2011/0005081 A1* | 1/2011 | Ouchi | ................... | B26B 19/063 30/43.92 |
| 2012/0227269 A1* | 9/2012 | Subramanian | ........ | B26B 19/282 30/210 |
| 2013/0097870 A1* | 4/2013 | Takaoka | ................ | B26B 19/28 30/42 |
| 2014/0130642 A1* | 5/2014 | Rodriguez | ............. | B26B 19/28 30/42 |
| 2015/0251325 A1* | 9/2015 | Teteak | .................... | B26B 19/06 30/228 |
| 2016/0146316 A1* | 5/2016 | Gilbert | .................... | B26B 19/28 30/215 |
| 2016/0303749 A1* | 10/2016 | Ziegler | .................... | B26B 19/06 |
| 2018/0194024 A1* | 7/2018 | Teteak | .................... | B26B 19/148 |
| 2018/0304479 A1* | 10/2018 | Murakami | ............. | B26B 19/06 |
| 2018/0311842 A1* | 11/2018 | Kraus | .................... | B26B 19/282 |

FOREIGN PATENT DOCUMENTS

| | | | | |
|---|---|---|---|---|
| EP | 2404715 A1 * | 1/2012 | ............ | B26B 19/04 |
| EP | 3424653 A1 * | 1/2019 | ............ | B26B 19/28 |
| JP | 2013-066548 A | 4/2013 | | |
| WO | WO-2019007864 A1 * | 1/2019 | ............ | B26B 19/28 |

* cited by examiner

ELECTRIC HAIR CUTTER

RELATED APPLICATIONS

This application claims the benefit of priority to Chinese Application No. 201710061467.0, filed on Jan. 26, 2017, the disclosure of which is incorporated by reference herein in its entirety.

BACKGROUND OF THE INVENTION

The present disclosure relates to an electric hair cutter.

One example of a known electric hair cutter, which is driven by electric power to cut body hair such as beard, includes an electric motor having an output shaft and a motion conversion mechanism that converts rotary motion of the output shaft of the electric motor into reciprocating linear motion. The reciprocating linear motion drives a movable blade with respect to a fixed blade. Japanese Laid-Open Patent Publication No. 2013-66548 discloses one example of such an electric hair cutter. As shown in FIG. 12, an electric hair cutter 900 includes a motion conversion mechanism 910 that includes a first conversion portion 911, a second conversion portion 912, and an output portion 913.

The first conversion portion 911 converts rotary motion of an output shaft 921 of an electric motor 920 into reciprocating linear motion in a direction intersecting with the axis of the output shaft 921. The second conversion portion 912 includes a link 912A and guides 912C. The link 912A is coupled to the first conversion portion 911 to convert the reciprocating linear motion transmitted from the first conversion portion 911 into a reciprocating linear motion performed in a direction extending along the axis of the output shaft 921. The guides 912C are in contact with opposite sides 912B of the link 912A so that the link 912A moves in the direction extending along the axis of the output shaft 921. The output portion 913 is coupled to the second conversion portion 912 to drive a movable blade 931 with respect to a fixed blade 932 when the reciprocating linear motion is transmitted from the second conversion portion 912.

In the motion conversion mechanism 910 of the above publication, the reciprocating linear motion that is transmitted from the first conversion portion 911 to the second conversion portion 912 contains a motion component corresponding to the direction extending along the axis of the output shaft 921 and a motion component corresponding to a direction orthogonal to the axis of the output shaft 921. Thus, when the second conversion portion 912 linearly reciprocates in the direction extending along the axis of the output shaft 921, the opposite sides 912B of the link 912A interfere with the guides 912C. Such interference of the link 912A with the guides 912C may generate a loud noise.

SUMMARY OF THE INVENTION

One aspect of the invention is an electric hair cutter that includes an electric motor including an output shaft, a motion conversion mechanism that converts rotary motion of the output shaft of the electric motor into reciprocating linear motion, and a movable blade driven by the reciprocating linear motion transmitted from the motion conversion mechanism. The motion conversion mechanism includes a first conversion portion, a second conversion portion, and an output portion. The first conversion portion converts the rotary motion of the output shaft into reciprocating rotary motion about a first axis intersecting with a direction parallel to the output shaft. The second conversion portion converts the reciprocating rotary motion into the reciprocating linear motion. The output portion couples the second conversion portion to the movable blade so that the movable blade performs the reciprocating linear motion. The second conversion portion includes a motion transmission part, which couples the first conversion portion to the output portion, and an elastic deformation part. The elastic deformation part is coupled to the motion transmission part to restrict motion of the motion transmission part caused by motion components that are contained in the reciprocating rotary motion, which is transmitted from the first conversion portion to the motion transmission part, and differ from a motion component in an output direction, which is a direction of the reciprocating linear motion, so that the motion transmission part performs the reciprocating linear motion caused by the motion component of the output direction.

The electric hair cutter limits generation of a loud noise while driving the movable blade.

Other aspects and advantages of the invention will become apparent from the following description, taken in conjunction with the accompanying drawings, illustrating by way of example the principles of the invention.

DETAILED DESCRIPTION OF THE PREFERRED EMBODIMENTS

Figure 1:
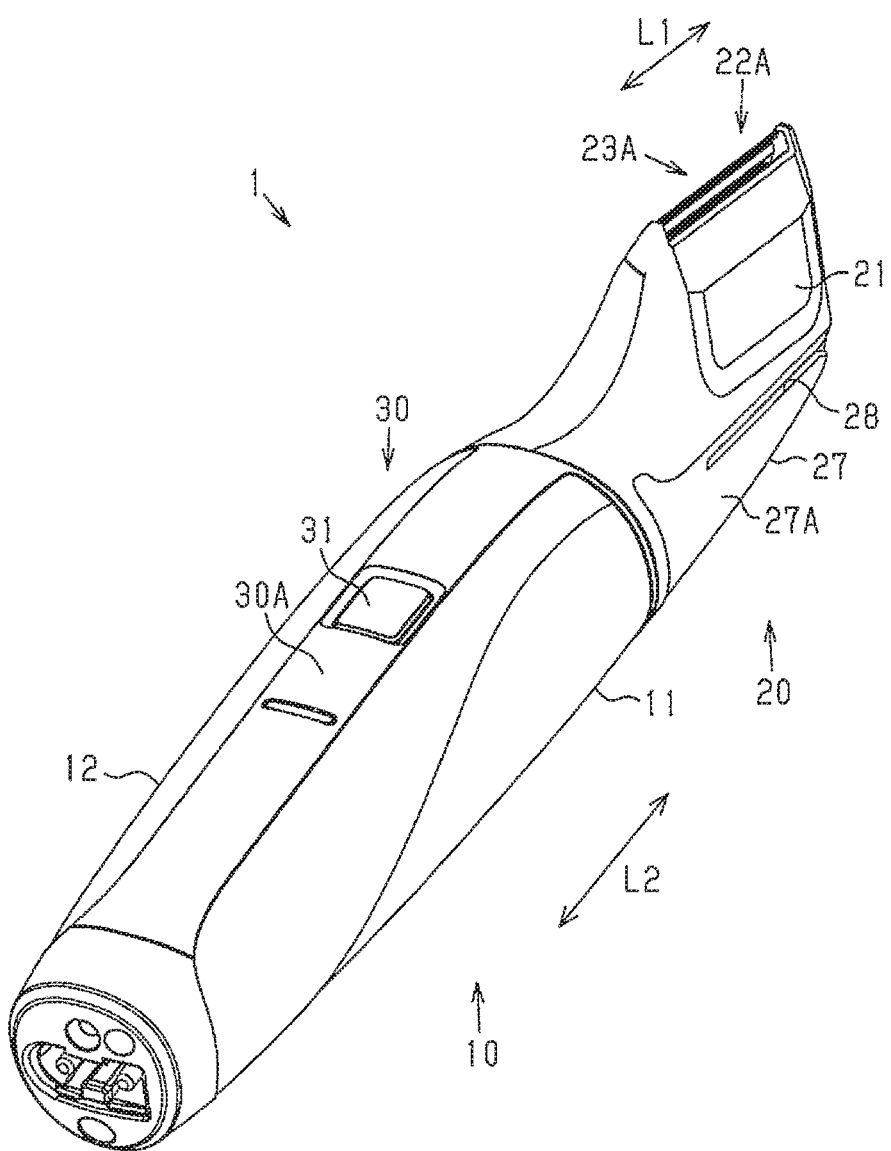
FIG. 1 is a perspective view showing one embodiment of an electric hair cutter.

Examples of Embodiments of Electric Hair Cutter (1) One embodiment of an electric hair cutter includes an electric motor including an output shaft, a motion conversion mechanism that converts rotary motion of the output shaft of the electric motor into reciprocating linear motion, and a movable blade driven by the reciprocating linear motion transmitted from the motion conversion mechanism. The motion conversion mechanism includes a first conversion portion, a second conversion portion, and an output portion. The first conversion portion converts the rotary motion of the output shaft into reciprocating rotary motion about a first axis intersecting with a direction parallel to the output shaft. The second conversion portion converts the reciprocating rotary motion into the reciprocating linear motion. The output portion couples the second conversion portion to the movable blade so that the movable blade performs the reciprocating linear motion. The second conversion portion includes a motion transmission part, which couples the first conversion portion to the output portion, and an elastic deformation part. The elastic deformation part is coupled to the motion transmission part to restrict motion of the motion transmission part caused by motion components that are contained in the reciprocating rotary motion, which is transmitted from the first conversion portion to the motion transmission part, and differ from a motion component in an output direction, which is a direction of the reciprocating linear motion, so that the motion transmission part performs the reciprocating linear motion caused by the motion component of the output direction. The elastic deformation part restricts motion of the motion transmission part caused by motion components differing from the motion component in the output direction. This limits contact of the second conversion portion with other components in the electric hair cutter. Thus, generation of a loud noise is limited during the driving of the movable blade.

(2) In one example of the electric hair cutter, the first conversion portion includes an eccentric shaft coupled to the output shaft so as to rotate about the output shaft at a position eccentric to the output shaft and an input conversion part coupled to the eccentric shaft to convert rotary motion of the eccentric shaft into the reciprocating rotary motion. The second conversion portion is coupled to the input conversion part to convert the reciprocating rotary motion of the input conversion part into the reciprocating linear motion. Thus, rotary motion of the output shaft of the electric motor is converted into reciprocating linear motion by a simple structure.

(3) In one example of the electric hair cutter, the input conversion part includes a first arm coupled to the eccentric shaft and a second arm extending from the first arm and coupled to the second conversion portion. The second conversion portion includes a restriction coupling part coupled to the second arm to allow the second arm to relatively move in a direction intersecting with the output direction and restrict relative movement of the second arm in the output direction. Thus, rotary motion of the output shaft of the electric motor is converted into reciprocating linear motion by a simple structure.

(4) In one example of the electric hair cutter, the motion conversion mechanism further includes a turning pair that couples the second conversion portion to the output portion. The turning pair includes a rotation shaft having a second axis intersecting with the output direction and a coupling portion coupled to the rotation shaft to allow the second conversion portion and the output portion to relatively rotate about the second axis. Thus, the reciprocating linear motion transmitted from the second conversion portion is easily transmitted to the movable blade via the output portion.

(5) One example of the electric hair cutter further includes a case that accommodates the electric motor and the motion conversion mechanism. The elastic deformation part includes a first part coupled to the case, a second part coupled to the motion transmission part, and an elastic part that couples the first part to the second part so as to elastically deform. The first part of the elastic deformation part is coupled to the case. Thus, the movement of the second conversion portion is easily stabilized when the electric motor is driven.

(6) In one example of the electric hair cutter, the elastic part includes a first elastic part and a second elastic part spaced apart from each other by a gap in the output direction. Thus, when the electric motor is driven, the movement of the second conversion portion is further easily stabilized.

(7) In one example of the electric hair cutter, the first axis is located between the first elastic part and the second elastic part. Thus, the motion conversion mechanism is miniaturized.

(8) In one example of the electric hair cutter, the turning pair is located between the first elastic part and the second elastic part. Thus, the motion conversion mechanism is miniaturized.

(9) In one example of the electric hair cutter, the first conversion portion and the second conversion portion are configured so that the output direction extends parallel to a straight line that extends through the second axis and a coupled portion of the second arm and the restriction coupling part. Thus, the direction of reciprocating linear motion transmitted from the second conversion portion to the output portion easily conforms to the direction of reciprocating linear motion transmitted from the output portion to the movable blade. This limits contact of the motion conversion mechanism with other components in the electric hair cutter.

(10) In one example of the electric hair cutter, the output portion includes a blade connector coupled to the movable blade. The electric hair cutter further includes a guide that guides the blade connector in the output direction. Thus, the reciprocating linear motion of the movable blade is easily stabilized.

Embodiments

FIG. 1 shows an outer appearance of an electric hair cutter 1. The electric hair cutter 1 has a size suitable for cutting, for example, beard or head hair. One example of the electric hair cutter 1 is a trimmer. The electric hair cutter 1 includes a body 10 and a blade unit 21. The body 10 accommodates various components of the electric hair cutter 1. The blade unit 21 functions to cut hair. The blade unit 21 is attached to the body 10 in a removable manner.

The body 10 includes a case 11 and a cover 12. The various components of the electric hair cutter 1 are accommodated in the case 11 (refer to FIG. 2). The cover 12 is attached to the case 11 in a removable manner. When the various components of the electric hair cutter 1 are accommodated in the case 11 and the cover 12 is attached to the case 11, the body 10 is formed.

The electric hair cutter 1 includes a head 20 and a grip 30. The head 20 includes the blade unit 21 and a support unit 27. The blade unit 21 is attached to the support unit 27 in a removable manner. The blade unit 21 includes a fixed blade 22A and a movable blade 23A. The grip 30 is configured to be held by a single hand of the user. The grip 30 supports the head 20. In one example, the grip 30 is formed integrally with the support unit 27. The grip 30 and the support unit 27 form a portion of the body 10.

The support unit 27 functions to support the blade unit 21. In one example, the support unit 27 is capable of supporting the blade unit 21 so that the blade edge of the fixed blade 22A and the blade edge of the movable blade 23A are faced in a direction intersecting with a longitudinal direction L2 of the grip 30. The head 20 is, for example, tapered toward the fixed blade 22A and the movable blade 23A at a portion forming the blade unit 21. The fixed blade 22A and the movable blade 23A project with respect to the grip 30. The portion of the head 20 forming the blade unit 21 includes the blade unit 21 and a portion of the support unit 27. The support unit 27 is, for example, constricted at a portion between the blade unit 21 and the grip 30 in a side view of the electric hair cutter 1 (refer to FIG. 2).

Figure 2:
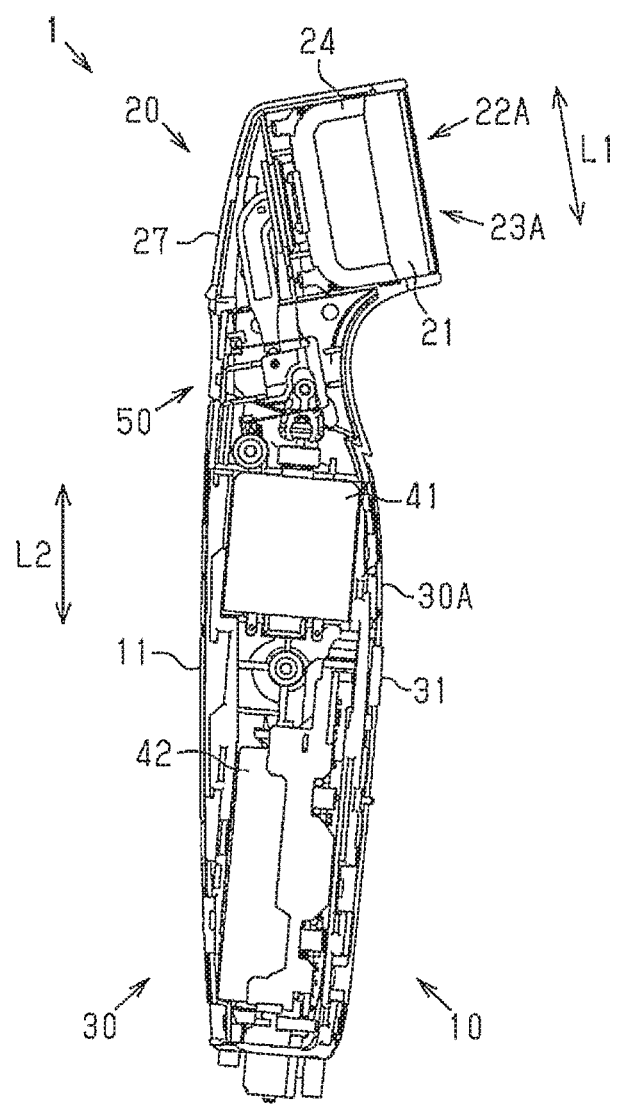
FIG. 2 is a side view showing the internal structure of the electric hair cutter shown in FIG. 1.

As shown in FIG. 2, the electric hair cutter 1 is configured so that the angle (hereafter referred to as "the blade angle") formed by a movement direction L1 of the movable blade 23A with respect to the fixed blade 22A and the longitudinal direction L2 of the grip 30 is an acute angle. The movement direction L1 of the movable blade 23A with respect to the fixed blade 22A is the same as a longitudinal direction of each of the fixed blade 22A and the movable blade 23A. It is preferred that the blade angle be determined based on the relationship between the blade angle and the operability of the electric hair cutter 1 when operated by the user. One example of a preferred range of the blade angles is less than or equal to 45°. In one example, the blade angle is 10°. The electric hair cutter 1 may be configured so that the movement direction L1 of the movable blade 23A and the longitudinal direction L2 of the grip 30 extend parallel to each other.

The electric hair cutter 1 further includes an electric motor 41, a motion conversion mechanism 50, and a power supply 42. The electric motor 41 and the power supply 42 are accommodated in, for example, a portion of the case 11 that forms the grip 30. The motion conversion mechanism 50 is mainly accommodated in a portion of the case 11 that forms the support unit 27. The electric motor 41 is electrically connected to the power supply 42. The electric motor 41 includes an output shaft 41A (refer to FIG. 4), which is coupled to the motion conversion mechanism 50. The motion conversion mechanism 50 functions to convert rotary motion of the output shaft 41A into reciprocating linear motion and transmit the reciprocating linear motion to the blade unit 21. The power supply 42 is capable of supplying power to the electric motor 41. The power supply 42 is, for example, a primary battery or a rechargeable battery.

Figure 3:
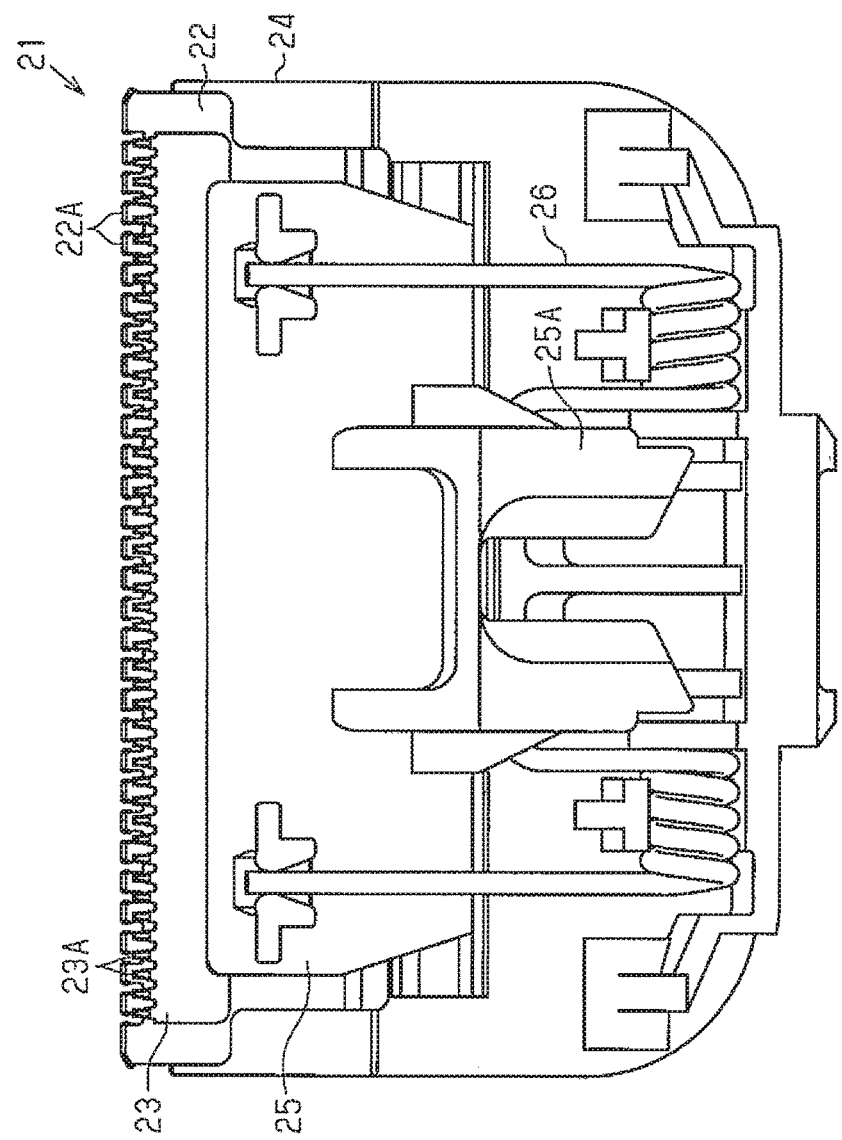
FIG. 3 is a front view showing an inner surface of the blade unit shown in FIG. 1.

As shown in FIG. 3, the blade unit 21 further includes a fixed plate 22, a movable plate 23, a frame 24, a holding plate 25, and a spring 26. The fixed plate 22 includes a plurality of fixed blades 22A. The movable plate 23 includes a plurality of movable blades 23A. The fixed plate 22 and the movable plate 23 are opposed to each other. The frame 24 supports the fixed plate 22 from a side opposite to the side where the movable plate 23 is located with respect to the fixed plate 22 to hold the fixed plate 22 to restrict displacement of the fixed plate 22. The holding plate 25 supports the movable plate 23 from a side opposite to the side where the fixed plate 22 is located with respect to the movable plate 23 to hold the movable plate 23 to restrict displacement of the movable plate 23. The spring 26 is attached to, for example, the frame 24 to press the movable plate 23 against the fixed plate 22 so that the fixed blade 22A and the movable blade 23A are in contact with each other. One example of the spring 26 is a double torsion spring.

The holding plate 25 includes a connection portion 25A. When the blade unit 21 is attached to the support unit 27 (refer to FIG. 2), the connection portion 25A is connected to the motion conversion mechanism 50 (refer to FIG. 2). When the electric motor 41 (refer to FIG. 2) is driven, the motion conversion mechanism 50 transmits force in only a width-wise direction of the blade unit 21 to the connection portion 25A. Accordingly, the movable plate 23 linearly reciprocates in the width-wise direction of the blade unit 21 via the holding plate 25. Thus, the movable blades 23A linearly reciprocate with respect to the fixed blades 22A.

As shown in FIG. 1, the electric hair cutter 1 further includes a power switch 31. The power switch 31 functions to switch activation and deactivation of the electric hair cutter 1. The power switch 31 is arranged, for example, on a front surface 30A of the grip 30. When the power switch 31 is set to activation, the electric motor 41 (refer to FIG. 2) is driven so that the movable blade 23A is driven by the reciprocating linear motion transmitted from the motion conversion mechanism 50 (refer to FIG. 2). This linearly reciprocates the movable blade 23A with respect to the fixed blade 22A to cut hair that is guided to a gap between the fixed blades 22A and the movable blades 23A.

The electric hair cutter 1 allows for attachment of various attachments. The various attachments include a first attachment 110 (refer to FIG. 10) and a second attachment 120 (refer to FIG. 11). Each of the attachments 110, 120 is attachable to, for example, the head 20. The head 20 includes guide portions 28. The guide portions 28 function to guide the attachments 110, 120 when attached to the head 20. One example of the guide portions 28 is a groove. The guide portions 28, for example, extend in each side surface 27A of the support unit 27 in the longitudinal direction of the fixed blade 22A and the movable blade 23A. The guide portions 28 are capable of receiving projections (not shown) arranged on an inner surface of each of the attachments 110, 120. When the projections of the attachments 110, 120 are inserted into the guide portions 28, the attachments 110, 120 are guided and attached to the head 20.

Figure 4:
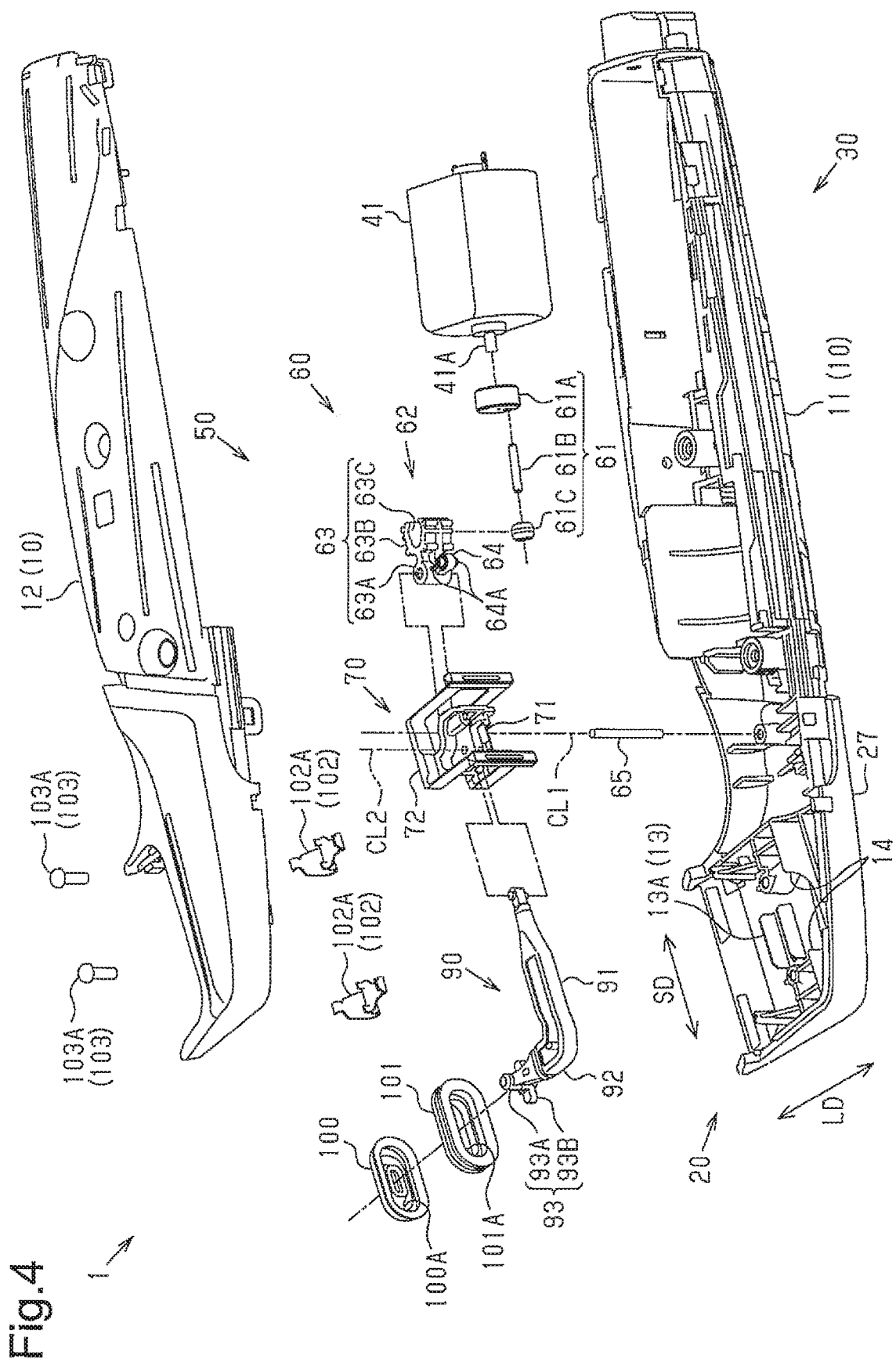
FIG. 4 is an exploded perspective view showing the electric hair cutter of FIG. 1.

The structure of the motion conversion mechanism 50 will now be described with reference to FIG. 4.

The motion conversion mechanism 50 includes a first conversion portion 60, a second conversion portion 70, and an output portion 90. The first conversion portion 60 functions to convert rotary motion of the output shaft 41A of the electric motor 41 into reciprocating rotary motion about a first axis CL1 that intersects with a direction parallel to the output shaft 41A. The first conversion portion 60 connects the output shaft 41A and the second conversion portion 70.

The first conversion portion 60 includes an eccentric rotation part 61 and an input conversion part 62. The eccentric rotation part 61 includes a rotary body 61A, an eccentric shaft 61B, and a roller 61C. The rotary body 61A is arranged on the output shaft 41A to be rotatable integrally with the output shaft 41A. The eccentric shaft 61B is coupled to the output shaft 41A via the rotary body 61A so as to rotate about the output shaft 41A at a position eccentric to the output shaft 41A. The roller 61C is arranged on the eccentric shaft 61B to be rotatable about the output shaft 41A together with the eccentric shaft 61B at a position eccentric to the output shaft 41A. In one example, the roller 61C is arranged on the eccentric shaft 61B to be relatively movable in the axial direction of the eccentric shaft 61B and rotatable relative to the eccentric shaft 61B.

The input conversion part 62 is coupled to the eccentric shaft 61B via the roller 61C so as to convert the rotary motion of the eccentric shaft 61B into reciprocating rotary motion. The input conversion part 62 includes a first arm 63, a second arm 64, and a rotation support shaft 65. The rotation support shaft 65 has the first axis CL1. In one example, the rotation support shaft 65 has one end rotationally supported by the case 11 and another end rotationally supported by the cover 12. The first arm 63 is coupled to the eccentric shaft 61B via the roller 61C. The first arm 63 includes a rotational center portion 63A and a recess 63B. The rotational center portion 63A is supported by the rotation support shaft 65 so that the input conversion part 62 is capable of reciprocally rotating about the first axis CL1.

Figure 5:
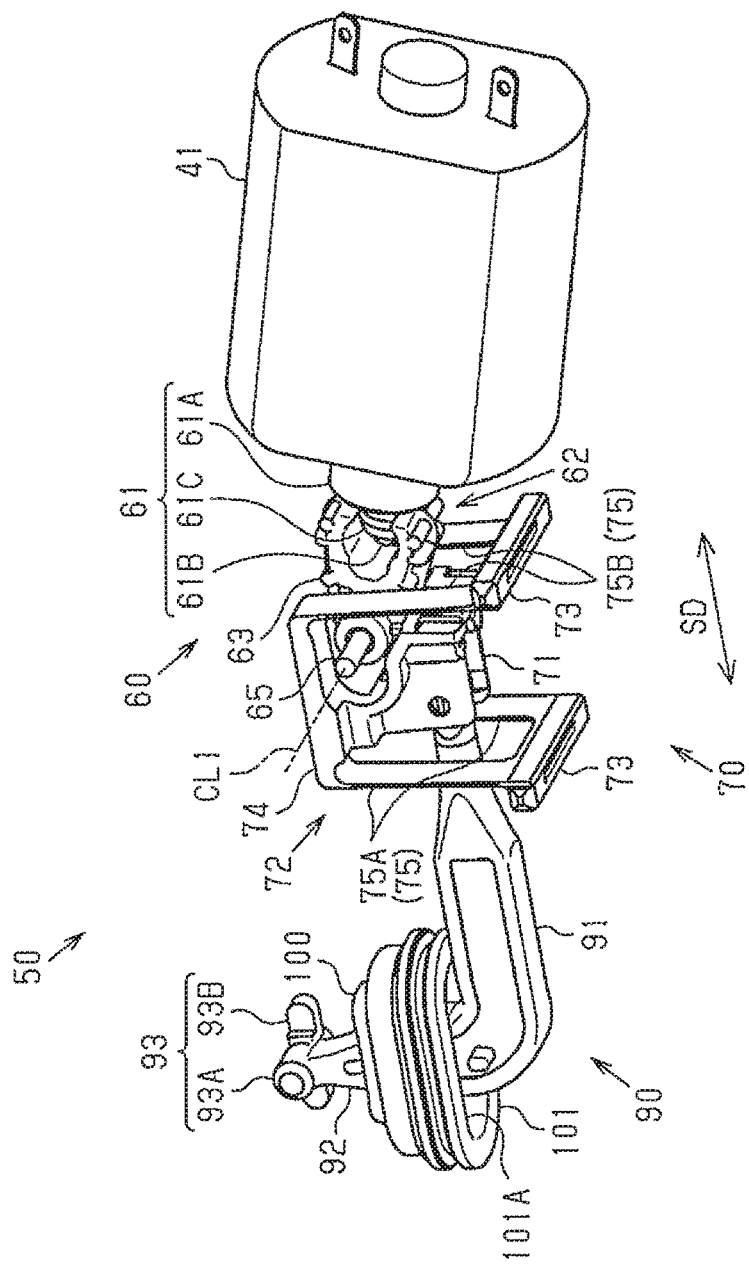
FIG. 5 is a perspective view showing the motion conversion mechanism of FIG. 4.

The recess 63B is defined by a wall surface 63C extending from the rotational center portion 63A around the roller 61C (refer to FIG. 5). When the electric motor 41 is driven, the roller 61C rotates about the output shaft 41A as the roller 61C rolls on the wall surface 63C of the recess 63B in a direction extending along the first axis CL1. This reciprocally rotates the first arm 63 about the first axis CL1.

The second arm 64 extends from the rotational center portion 63A of the first arm 63 and is coupled to the second conversion portion 70. The second arm 64 includes two projections 64A. The two projections 64A are arranged, for example, to project in opposite directions in a direction extending along the first axis CL1. When the two projections 64A are inserted into the second conversion portion 70, the second arm 64 is coupled to the second conversion portion 70. When the first arm 63 reciprocally rotates about the first axis CL1, the second arm 64 reciprocally rotates to transmit the reciprocating rotary motion to the second conversion portion 70. The input conversion part 62 is configured so that, for example, the angle formed by the first arm 63 and the second arm 64 (hereafter referred to as "the arm angle") is an acute angle. The arm angle is an angle formed by the center line of the first arm 63 and the center line of the second arm 64. One example of a preferred range of the arm angles is greater than or equal to 45° and less than 90°. In one example, the arm angle is 70°.

The second conversion portion 70 functions to convert the reciprocating rotary motion transmitted from the first conversion portion 60 into reciprocating linear motion. In one example, the second conversion portion 70 converts the reciprocating rotary motion of the first conversion portion 60 into reciprocating linear motion in an output direction SD, which conforms to the movement direction L1 (refer to FIG. 2) of the movable blade 23A with respect to the fixed blade 22A. The second conversion portion 70 is coupled to the input conversion part 62 so as to convert the reciprocating rotary motion of the input conversion part 62 into reciprocating linear motion. In one example, the material of the second conversion portion 70 is a resin.

The second conversion portion 70 includes a motion transmission part 71 and an elastic deformation part 72. The motion transmission part 71 is line-symmetrical with respect to the direction extending along the first axis CL1. The motion transmission part 71 couples the first conversion portion 60 to the output portion 90. In one example, the motion transmission part 71 is coupled to the second arm 64 of the input conversion part 62.

The elastic deformation part 72 is, for example, line-symmetrical with respect to the direction extending along the output direction SD and the direction extending along the first axis CL1. The elastic deformation part 72 is coupled to the motion transmission part 71 to restrict motion of the motion transmission part 71 caused by motion components that are contained in the reciprocating rotary motion, which is transmitted from the first conversion portion 60 to the motion transmission part 71, and differ from a motion component in the output direction SD so that the motion transmission part 71 is linearly reciprocated by the motion component in the output direction. The elastic deformation part 72 is, for example, arranged on the motion transmission part 71 to surround the motion transmission part 71.

The output portion 90 couples the second conversion portion 70 to the movable blade 23A so that the movable blade 23A linearly reciprocates. The output portion 90 includes a first part 91 and a second part 92. The first part 91 extends, for example, in the output direction SD and is configured to be a part of the output portion 90 coupled to the second conversion portion 70. The second part 92 extends, for example, in a direction that is orthogonal to the output direction SD and also orthogonal to a direction extending along the first axis CL1 (hereafter, referred to as "the linear direction LD"). The second part 92 is configured to be a part of the output portion 90 coupled to the movable blade 23A. The first part 91 is continuous with the second part 92.

The output portion 90 further includes a blade connector 93. The blade connector 93 is arranged, for example, on the distal end of the second part 92. When the blade connector 93 is connected to the connection portion 25A of the blade unit 21 (refer to FIG. 3), the blade connector 93 is coupled to the movable blade 23A. The blade connector 93 includes a projection 93A and a support portion 93B. The projection 93A is configured to be inserted into the connection portion 25A. The support portion 93B supports the projection 93A. In one example, when the blade unit 21 is attached to the body 10, the connection portion 25A is connected to the projection 93A so that the blade connector 93 is coupled to the movable blade 23A. Consequently, the reciprocating linear motion of the output portion 90 is transmitted to the movable blade 23A to linearly reciprocate the movable blade 23A with respect to the fixed blade 22A.

The electric hair cutter 1 further includes a guide 13. The guide 13 functions to guide the blade connector 93 in the output direction SD. The guide 13 is arranged, for example, on a portion of the case 11 corresponding to where the blade connector 93 is accommodated. The guide 13 includes a groove 13A. The groove 13A extends, for example, in the output direction SD. With the output portion 90 accommodated in the case 11, the support portion 93B of the blade connector 93 is fitted into the groove 13A (refer to FIG. 6). When the output portion 90 linearly reciprocates, the blade connector 93 linearly reciprocates along the groove 13A of the guide 13. Thus, the reciprocating linear motion of the movable blade 23A is easily stabilized.

The electric hair cutter 1 further includes a sealing portion 100 and a seal support portion 101. The sealing portion 100 functions to hinder moisture, objects, and the like from entering the body 10. In one example, the material of the sealing portion 100 is rubber. The sealing portion 100 has an elongated hole 100A. The second part 92 of the output portion 90 is arranged to extend through the elongated hole 100A. The elongated hole 100A extends in the output direction SD to allow for the reciprocating linear motion of the second part 92. The sealing portion 100, which is arranged, for example, to cover the second part 92, is attached to the seal support portion 101.

The seal support portion 101 functions to support the sealing portion 100. The seal support portion 101 has an elongated hole 101A. The second part 92 of the output portion 90 is arranged to extend through the elongated hole 101A. The elongated hole 101A extends in the output direction SD to allow for the reciprocating linear motion of the second part 92. The seal support portion 101, which is arranged, for example, to cover the second part 92, is attached to ribs 14 arranged in the case 11 (refer to FIG. 6). When the output portion 90 linearly reciprocates, the second part 92 linearly reciprocates in the ranges of the elongated holes 100A, 101A.

The electric hair cutter 1 further includes a holding portion 102 and a fixing portion 103. The holding portion 102 functions to hold the blade unit 21 on the body 10. The holding portion 102 includes two springs 102A. The two springs 102A are arranged in the case 11 at portions corresponding to the blade unit 21. When the blade unit 21 is attached to the body 10, the blade unit 21 is held by the two springs 102A onto the body 10. The fixing portion 103 functions to fix the cover 12 to the case 11. The fixing portion 103 includes two screws 103A. When the cover 12 is attached to the case 11 and the two screws 103A are inserted through the case 11 and the cover 12, the cover 12 is fixed to the case 11.

The specific structure of the second conversion portion 70 will now be described with reference to FIGS. 5 to 7.

As shown in FIG. 5, the second conversion portion 70 couples the input conversion part 62 to the output portion 90. The elastic deformation part 72 includes two first parts 73, two second parts 74, and an elastic part 75. The two first parts 73 are, for example, coupled to the case 11 (refer to FIG. 6) to extend in a direction extending along the first axis CL1. In one example, the case 11 includes attachment portions 15, to which the two first parts 73 are inserted and fixed (refer to FIG. 6). Thus, when the electric motor 41 is driven, the movement of the second conversion portion 70 is easily stabilized. The two second parts 74 are arranged, for example, to be coupled to the motion transmission part 71 and extend in the output direction SD.

The elastic part 75 couples the first parts 73 to the second parts 74 so as to elastically deform. The elastic part 75 is thinner than each of the first parts 73 and the second parts 74. The elastic part 75 includes two first elastic parts 75A and two second elastic parts 75B. The two first elastic parts 75A are spaced apart from the two second elastic parts 75B by a gap in the output direction SD. One of the two first elastic parts 75A is spaced apart from the other one of the two first elastic parts 75A by a gap in a direction extending along the first axis CL1. One of the two second elastic parts 75B is spaced apart from the other one of the two second elastic parts 75B by a gap in the direction extending along the first axis CL1. Thus, when the electric motor 41 is driven, the movement of the second conversion portion 70 is further easily stabilized. In one example, the elastic parts 75A, 75B couple each end of the first parts 73 to each end of the second parts 74. The first axis CL1 is located between the two first elastic parts 75A and the two second elastic parts 75B. Thus, the motion conversion mechanism 50 is miniaturized.

Figure 6:
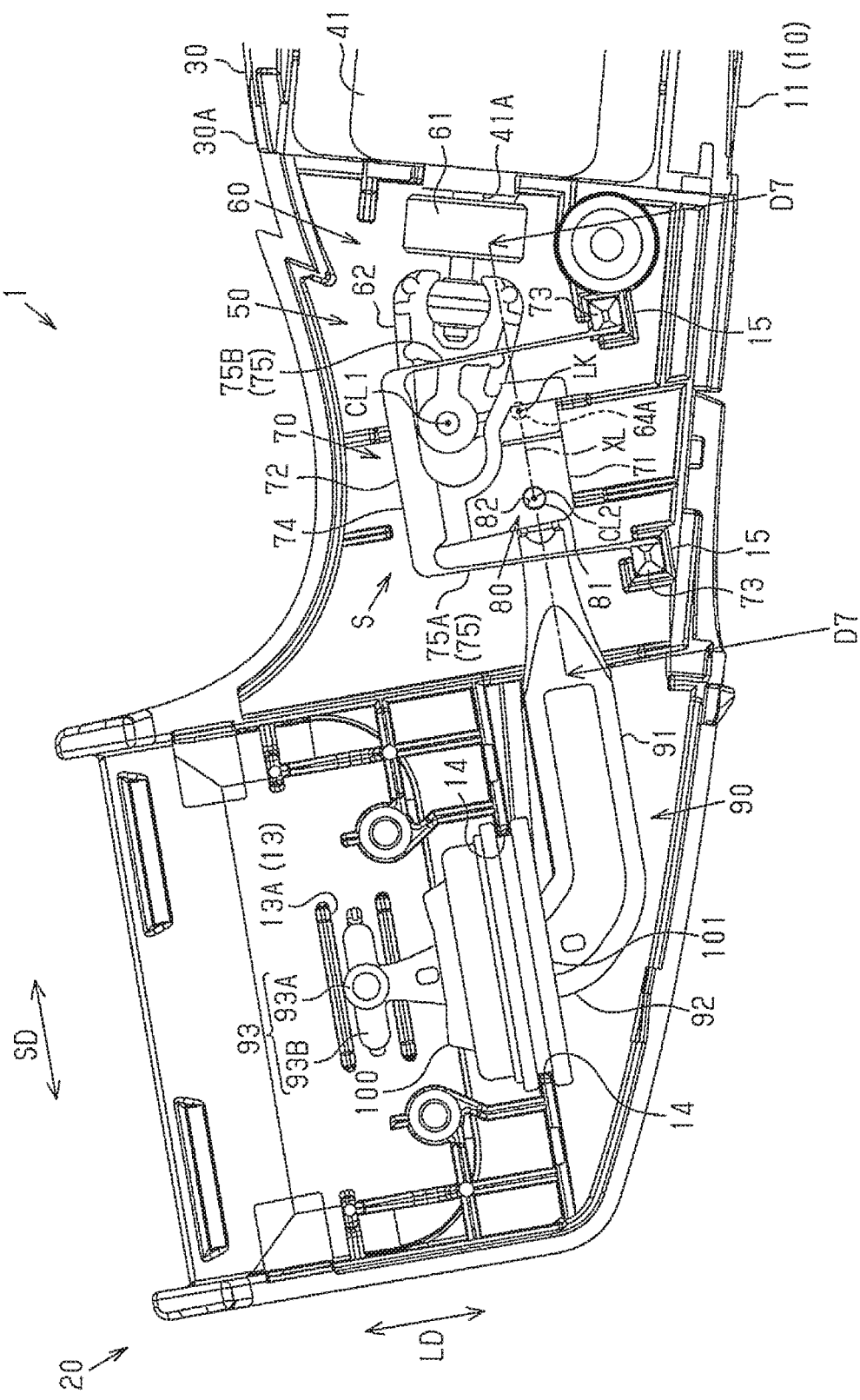
FIG. 6 is a side view of the motion conversion mechanism arranged in the electric hair cutter of FIG. 2.

As shown in FIG. 6, the motion conversion mechanism 50 is accommodated in the case 11 so that the second conversion portion 70 is spaced apart from the case 11 by a clearance S. This limits contact of the second conversion portion 70 with the case 11 even when the second conversion portion 70 is moved by the driving of the electric motor 41.

The motion conversion mechanism 50 further includes a turning pair 80. The turning pair 80 functions to couple the second conversion portion 70 to the output portion 90. The turning pair 80 is arranged between the two first elastic parts 75A and the two second elastic parts 75B. Thus, the motion conversion mechanism 50 is miniaturized.

The turning pair 80 includes a rotation shaft 81 and a coupling portion 82. The rotation shaft 81 has a second axis CL2 intersecting with the output direction SD. The second axis CL2 extends parallel to the first axis CL1. The rotation shaft 81 is arranged, for example, on an end of the first part 91 of the output portion 90. The coupling portion 82 is coupled to the rotation shaft 81 to allow the second conversion portion 70 and the output portion 90 to relatively rotate about the second axis CL2. The coupling portion 82 is arranged, for example, on the motion transmission part 71 of the second conversion portion 70.

Figure 7:
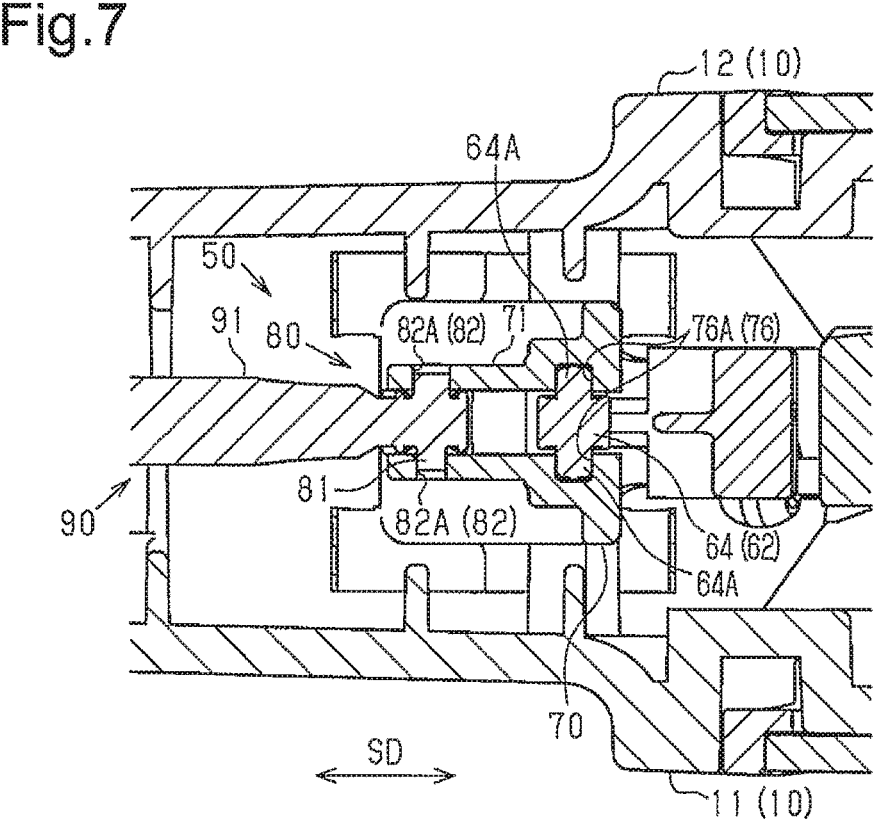
FIG. 7 is a cross-sectional view taken along line D7-D7 in FIG. 6.

As shown in FIG. 7, the coupling portion 82 has two holes 82A. When the rotation shaft 81 is inserted into the two holes 82A, the output portion 90 is coupled to the motion transmission part 71 so as to rotate relative to the second conversion portion 70. Thus, the reciprocating linear motion transmitted from the second conversion portion 70 is easily transmitted to the movable blade 23A (refer to FIG. 3) via the output portion 90. Additionally, the rotation shaft 81 is arranged so as not to project out of the two holes 82A. Thus, the output portion 90 is easily coupled to the motion transmission part 71.

The second conversion portion 70 further includes a restriction coupling part 76. The restriction coupling part 76 is coupled to the second arm 64 of the input conversion part 62 to allow the second arm 64 to relatively move in a direction intersecting with the output direction SD and restrict relative movement of the second arm 64 in the output direction SD. One example of the direction intersecting with the output direction SD is the linear direction LD (refer to FIG. 6). The restriction coupling part 76 is arranged on the motion transmission part 71.

The restriction coupling part 76 includes two grooves 76A. The grooves 76A extend in the motion transmission part 71 in the linear direction LD. The second arm 64 is coupled to the second conversion portion 70 so that when the two projections 64A are inserted into the respective grooves 76A, the reciprocating rotary motion about the first axis CL1 (refer to FIG. 6) is transmitted to the second conversion portion 70. The elastic deformation of the elastic parts 75A, 75B (refer to FIG. 6) absorbs motion of the motion transmission part 71 caused by motion components that are contained in the reciprocating rotary motion transmitted from the input conversion part 62 and differ from the motion component in the output direction SD. This allows the motion transmission part 71 to be linearly reciprocated by the motion component in the output direction SD. Thus, the rotary motion of the output shaft 41A (refer to FIG. 6) of the electric motor 41 is converted into the reciprocating linear motion by a simple structure.

As shown in FIG. 6, the first conversion portion 60 and the second conversion portion 70 are configured so that the output direction SD extends parallel to a straight line (hereafter, referred to as "the imaginary line XL") that extends through the second axis CL2 and a coupled portion LK, coupling the second arm 64 and the restriction coupling part 76. The imaginary line XL extends in the same direction as the single-dashed line of FIG. 6 indicating a cross section. Thus, the direction of the reciprocating linear motion transmitted from the second conversion portion 70 to the output portion 90 easily conforms to the direction of reciprocating linear motion transmitted from the output portion 90 to the movable blade 23A (refer to FIG. 3). This limits contact of the motion conversion mechanism 50 with other components in the electric hair cutter 1.

Figure 8:
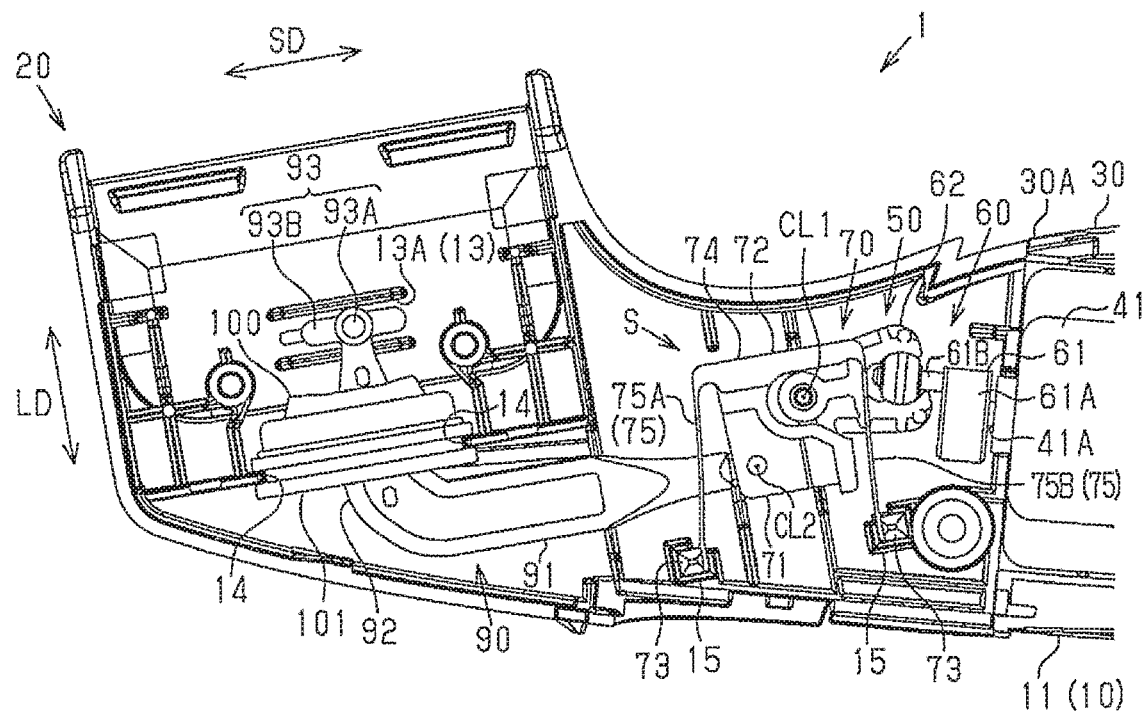
FIG. 8 is a side view of the electric hair cutter with the motion conversion mechanism of FIG. 6 set to a first state.

The operation of the motion conversion mechanism 50 will now be described with reference to FIGS. 8 and 9.

Figure 9:
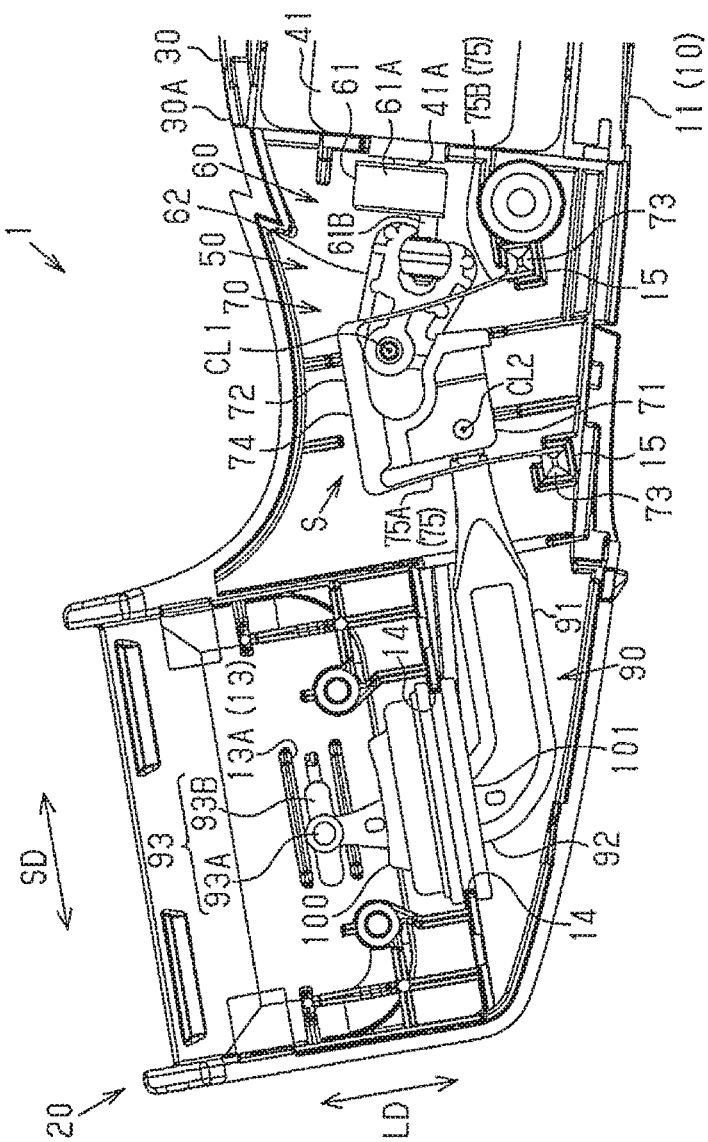
FIG. 9 is a side view of the electric hair cutter with the motion conversion mechanism of FIG. 6 set to a second state.

When the electric motor 41 is driven, the motion conversion mechanism 50 performs an operation that repeats a first state (refer to FIG. 8) and a second state (refer to FIG. 9). FIG. 8 shows the first state of the motion conversion mechanism 50 in which the eccentric shaft 61B of the eccentric rotation part 61 is located at the position closest to the front surface 30A of the grip 30 and the output portion 90 is located at the position closest to the electric motor 41. When the second conversion portion 70 is in the first state, the second parts 74 of the elastic deformation part 72 are moved closest to the electric motor 41 and the elastic part 75 is bent to follow the movement of the second parts 74. The elastic deformation of the elastic part 75 restricts motion of the motion transmission part 71 caused by the motion components contained in the reciprocating rotary motion, which is transmitted from the first conversion portion 60 to the motion transmission part 71, and differing from the motion component in the output direction SD. This limits contact of the second conversion portion 70 with other components in the electric hair cutter 1.

The rotation of the output shaft 41A of the electric motor 41 shifts the motion conversion mechanism 50 from the first state to the second state. In the process of shifting from the first state to the second state, the motion conversion mechanism 50 is set in a state that is the same as or similar to the state shown in FIG. 6. The motion conversion mechanism 50 is, for example, in a state in which the eccentric shaft 61B of the eccentric rotation part 61 is located at the position closest to the case 11 and the output portion 90 is located in an intermediate position of a movable range. The movable range of the output portion 90 is a range in which the output portion 90 is capable of performing reciprocating linear motion.

FIG. 9 shows the second state of the motion conversion mechanism 50 in which the eccentric shaft 61B of the eccentric rotation part 61 is located at the position farthest from the front surface 30A of the grip 30 and the output portion 90 is located at the position farthest from the electric motor 41. When the second conversion portion 70 is in the second state, the second parts 74 of the elastic deformation part 72 are moved farthest from the electric motor 41 and the elastic part 75 is bent to follow the movement of the second parts 74. The elastic deformation of the elastic part 75 restricts motion of the motion transmission part 71 caused by the motion components contained in the reciprocating rotary motion, which is transmitted from the first conversion portion 60 to the motion transmission part 71, and differing from the motion component in the output direction SD. This limits contact of the second conversion portion 70 with other components in the electric hair cutter 1.

The rotation of the output shaft 41A of the electric motor 41 shifts the motion conversion mechanism 50 from the second state to the first state. In the process of shifting from the second state to the first state, the motion conversion mechanism 50 is set to a state that is the same as or similar to the state shown in FIG. 6. The motion conversion mechanism 50 is, for example, in a state in which the eccentric shaft 61B of the eccentric rotation part 61 is located at the position closest to the cover 12 (refer to FIG. 4) and the output portion 90 is in an intermediate position of the movable range.

As described above, when the electric motor 41 is driven, the motion conversion mechanism 50 performs the operation repeating the first state and the second state. Thus, contact of the second conversion portion 70 with other components in the electric hair cutter 1 is limited during the driving of the electric motor 41. This limits generation of a loud noise during the driving of the movable blade 23A (refer to FIG. 3). Additionally, when the motion conversion mechanism 50 is accommodated in the case 11, the second conversion portion 70 is spaced apart from the case 11 by the clearance S. This further limits contact of the second conversion portion 70 with the case 11 and generation of a loud noise during the driving of the movable blade 23A.

Figure 10:
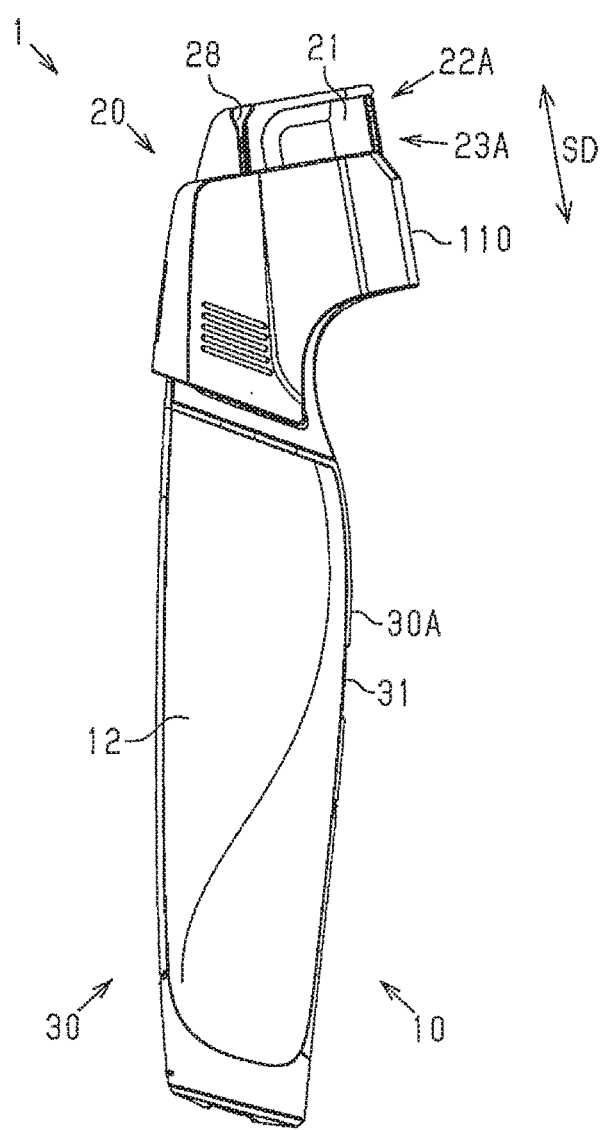
FIG. 10 is a side view of the electric hair cutter to which a first attachment is attached.

FIG. 10 shows the electric hair cutter 1 to which the first attachment 110 is attached. The first attachment 110 is attached to the head 20 so that the head 20 is partially exposed to the exterior. In one example, with the first attachment 110 attached to the head 20, the fixed blade 22A and the movable blade 23A are partially exposed to the exterior, and the remaining parts of the fixed blade 22A and the movable blade 23A are covered by the first attachment 110. One example of a preferred range of the lengths of the fixed blade 22A and the movable blade 23A exposed to the exterior (hereafter, referred to as "the exposure length") is 1 to 20 mm. In one example, the exposure length is 12 mm. The exposure length is a measurement in the output direction SD. The electric hair cutter 1 to which the first attachment 110 is attached may be used to locally cut hair of a subject part. The first attachment 110 may have a structure capable of adjusting the exposure length.

Figure 11:
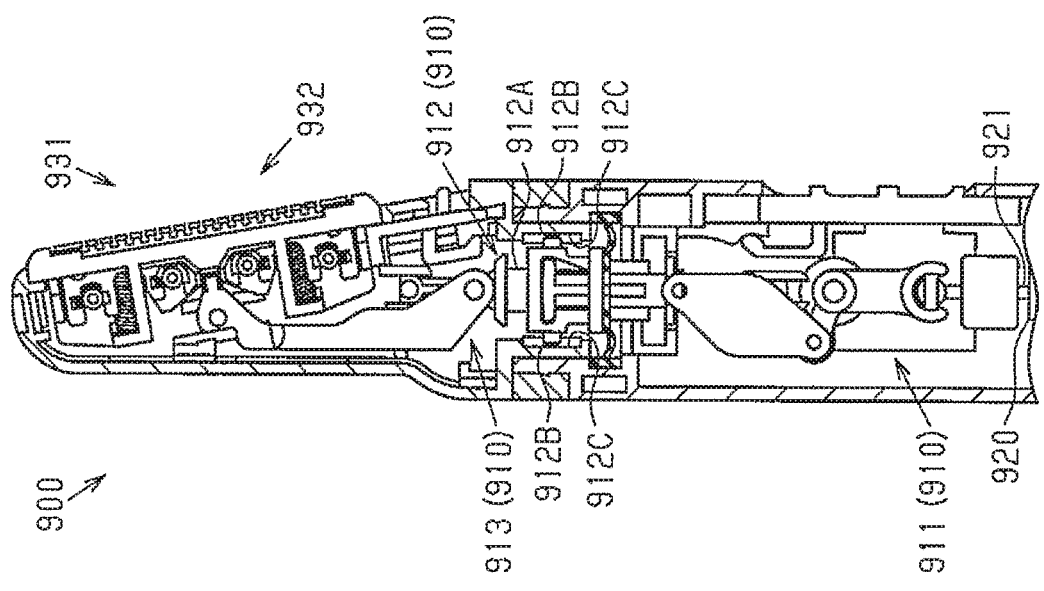
FIG. 11 is a side view of the electric hair cutter to which a second attachment is attached.
Figure 12:
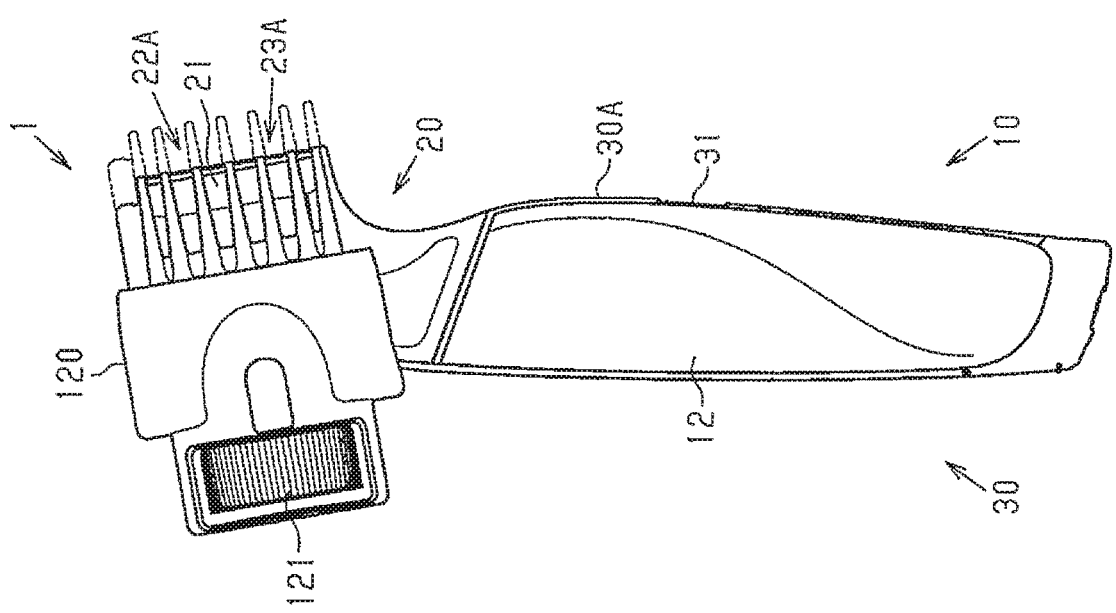
FIG. 12 is a cross-sectional view showing the internal structure of a prior art electric hair cutter.

FIG. 11 shows the electric hair cutter 1 to which the second attachment 120 is attached. The second attachment 120 is attached to the head 20 to cover the head 20. The second attachment 120 may be operated in any one of a first mode and a second mode that guide different lengths of hair into a gap between the fixed blade 22A and the movable blade 23A (hereafter, referred to as "the cut length"). In the first mode, the cut length is maximal. In the second mode, the cut length is shorter than that of the first mode. The solid lines of FIG. 11 show the second attachment 120 operated in the first mode. The double-dashed lines of FIG. 11 show the second attachment 120 that is set in the second mode. In the illustrated example, the cut length is minimal in the second mode. The second attachment 120 includes an operation portion 121, which is operated to set the second attachment 120 to one of the first mode and the second mode. When using the electric hair cutter 1 to which the second attachment 120 is attached, the user may adjust to any cut length.

One example of usage of the electric hair cutter 1 will now be described with reference to FIG. 1.

The user may use the electric hair cutter 1, for example, as follows. First, the power switch 31 of the electric hair cutter 1 is operated to power on the electric hair cutter 1. When the electric hair cutter 1 is powered on, the electric motor 41 (refer to FIG. 2) is driven to start reciprocating linear motion of the movable blade 23A with respect to the fixed blade 22A. During the driving of the movable blade 23A, the elastic deformation part 72 restricts motion of the motion transmission part 71 caused by motion components differing from the motion component in the output direction SD. This limits contact of the second conversion portion 70 (refer to FIG. 6) with other components in the electric hair cutter 1. Accordingly, generation of a loud noise is limited during the driving of the movable blade 23A.

The grip 30 of the electric hair cutter 1 is held by a single hand and the electric hair cutter 1 is moved along the skin with the fixed blade 22A in contact with the skin. In accordance with this movement, the fixed blade 22A and the movable blade 23A cut beard, which is one example of hair of the subject part. The electric hair cutter 1 may be used with one of the attachments 110, 120 attached.

Modified Examples

The above description illustrates embodiments of an electric hair cutter according to the present invention and is not intended to be restrictive. The embodiments may be modified as follows. Further, two or more of the modified examples may be combined.

The first conversion portion 60 and the second conversion portion 70 may have any relationship. In one example, the first conversion portion 60 and the second conversion portion 70 are configured so that the imaginary line XL intersects with the output direction SD. In this example, it is preferred that the angle formed by the imaginary line XL and the output direction SD be set to be close to 0°.

The first axis CL1 may be located at any position. In a first example, the first axis CL1 is located closer to the movable blade 23A than the two first elastic parts 75A. In a second example, the first axis CL1 is located closer to the electric motor 41 than the two second elastic parts 75B. In a third example, the first axis CL1 is located at a position other than the position between the two first elastic parts 75A and the two second elastic parts 75B in the linear direction LD.

The turning pair 80 may be located at any position. In a first example, the turning pair 80 is located closer to the movable blade 23A than the two first elastic parts 75A. In a second example, the turning pair 80 is located closer to the electric motor 41 than the two second elastic parts 75B. In a third example, the turning pair 80 is located at a position other than the position between the two first elastic parts 75A and the two second elastic parts 75B in the linear direction LD.

The turning pair 80 may have any structure. In a first example, the coupling portion 82 is coupled to the rotation shaft 81 so that the second conversion portion 70 and the output portion 90 will not relatively rotate about the second axis CL2. In a second example, the rotation shaft 81 is arranged on the motion transmission part 71 of the second conversion portion 70, and the coupling portion 82 is arranged on an end of the first part 91 of the output portion 90.

The input conversion part 62 and the second conversion portion 70 may have any structure. In one example, the second arm 64 includes two grooves, and the restriction coupling part 76 includes two projections. In this example, the second arm 64 is coupled to the second conversion portion 70 so that when the two projections of the restriction coupling part 76 are inserted into the respective grooves, the reciprocating rotary motion about the first axis CL1 is transmitted to the second conversion portion 70.

The second parts 74 of the elastic deformation part 72 may have any structure. In one example, the second parts 74 and the elastic part 75 have substantially the same thickness. Thus, the second parts 74 are elastically deformable.

The elastic part 75 may have any structure. In a first example, the number of the two first elastic parts 75A is one or three or more. In a second example, the number of the two second elastic parts 75B is one or three or more. In a third example, one of the set of the two first elastic parts 75A and the set of the two second elastic parts 75B is omitted from the elastic part 75.

The guide 13 may be omitted from the electric hair cutter 1. In this example, when the output portion 90 performs the reciprocating linear motion, the blade connector 93 is not guided by the guide 13. Thus, noise that would be caused by contact of the blade connector 93 with the guide 13 will not be generated during the driving of the movable blade 23A. Additionally, the support portion 93B may be omitted from the blade connector 93.

The guide portion 28 may be omitted from the electric hair cutter 1. Even when the guide portion 28 is omitted, each of the attachments 110, 120 is attachable to the head 20.

The electric hair cutter 1 may be changed to any size. In one example, the electric hair cutter 1 has a size suitable for cutting eyebrows and eyelashes.

The electric hair cutter is applicable to various kinds of electric hair cutters including those for household use and commercial use.

The present examples and embodiments are to be considered as illustrative and not restrictive and the invention is not to be limited to the details given herein, but may be modified within the scope and equivalence of the appended claims.

DESCRIPTION OF REFERENCE CHARACTERS

1: electric hair cutter
11: case
13: guide
23A: movable blade
41: electric motor
41A: output shaft
50: motion conversion mechanism
60: first conversion portion
61B: eccentric shaft
62: input conversion part
63: first arm
64: second arm
70: second conversion portion
71: motion transmission part
72: elastic deformation part
73: first part
74: second part
75: elastic part
75A: first elastic part
75B: second elastic part
76: restriction coupling part
80: turning pair
81: rotation shaft
82: coupling portion
90: output portion
93: blade connector
CL1: first axis
CL2: second axis
LK: coupled portion
SD: output direction

The invention claimed is:

1. An electric hair cutter comprising:
an electric motor including an output shaft;
a motion conversion mechanism that converts rotary motion of the output shaft into reciprocating linear motion;
a movable blade driven by the reciprocating linear motion transmitted from the motion conversion mechanism; and
a case that accommodates the electric motor and the motion conversion mechanism, wherein
the motion conversion mechanism includes a first conversion portion, a second conversion portion, and an output portion,
the first conversion portion converts the rotary motion of the output shaft into reciprocating rotary motion about a first axis, wherein the first axis intersects with an axis of the output shaft,
the second conversion portion converts the reciprocating rotary motion into the reciprocating linear motion,
the output portion couples the second conversion portion to the movable blade so that the movable blade performs the reciprocating linear motion,
the first conversion portion includes an eccentric rotation part, which is coupled to the output shaft so as to eccentrically rotate, and an input conversion part, which is coupled to the eccentric rotation part and reciprocatively rotated about the first axis,
the second conversion portion includes a motion transmission part, which is coupled to the input conversion part and to which the reciprocating rotary motion is transmitted, and an elastic deformation part, which restricts motion of the motion transmission part so that the motion transmission part performs the reciprocating linear motion.

2. The electric hair cutter according to claim 1, wherein the output portion includes a blade connector coupled to the movable blade, and
the electric hair cutter further comprises a guide that guides the blade connector in an output direction, which is a movement direction of the movable blade.

3. The electric hair cutter according to claim 1, wherein the eccentric rotation part includes an eccentric shaft coupled to the output shaft so as to rotate about the output shaft at a position eccentric to the output shaft,
the input conversion part is coupled to the eccentric shaft to convert rotary motion of the eccentric shaft into the reciprocating rotary motion, and is pivotal with respect to the case via a rotation support shaft, and
the second conversion portion is coupled to the input conversion part to convert the reciprocating rotary motion of the input conversion part into the reciprocating linear motion.

4. The electric hair cutter according to claim 3, wherein the input conversion part includes a first arm coupled to the eccentric shaft and a second arm extending from the first arm and coupled to the motion transmission part, and
the motion transmission part includes a restriction coupling part coupled to the second arm to allow the second arm to relatively move in a direction intersecting with an output direction, which is a movement direction of the movable blade, and restrict relative movement of the second arm in the output direction.

5. The electric hair cutter according to claim 4, wherein the motion conversion mechanism further includes a turning pair that couples the second conversion portion to the output portion,
the turning pair includes
  a rotation shaft arranged on an end of the output portion, the rotation shaft extending in a direction intersecting with the output direction, and
  a coupling portion arranged on the motion transmission part of the second conversion portion and coupled to the rotation shaft to allow the second conversion portion and the output portion to relatively rotate, and
the first conversion portion and the second conversion portion are configured so that the output direction extends parallel to a straight line that connects the turning pair and a coupled portion of the second arm and the restriction coupling part.

6. The electric hair cutter according to claim 1, wherein the motion conversion mechanism further includes a turning pair that couples the second conversion portion to the output portion, and
the turning pair includes
a rotation shaft arranged on an end of the output portion, the rotation shaft extending in a direction intersecting with an output direction, which is a movement direction of the movable blade, and
a coupling portion arranged on the motion transmission part of the second conversion portion and coupled to the rotation shaft to allow the second conversion portion and the output portion to relatively rotate.

7. The electric hair cutter according to claim 6, wherein the elastic deformation part includes a first part coupled to the case, a second part coupled to the motion transmission part, and an elastic part that couples the first part to the second part so as to elastically deform,
the elastic part includes a first elastic part and a second elastic part spaced apart from each other by a gap in the output direction, and
the turning pair is located between the first elastic part and the second elastic part.

8. The electric hair cutter according to claim 1,
wherein the elastic deformation part includes a first part coupled to the case, a second part coupled to the motion transmission part, and an elastic part that couples the first part to the second part so as to elastically deform.

9. The electric hair cutter according to claim 8, wherein the elastic part includes a first elastic part and a second elastic part spaced apart from each other by a gap in an output direction, which is a movement direction of the movable blade.

10. The electric hair cutter according to claim 9, wherein the first axis is located between the first elastic part and the second elastic part.

* * * * *